(12) United States Patent
Yoon

(10) Patent No.: US 9,545,924 B2
(45) Date of Patent: Jan. 17, 2017

(54) METHOD AND APPARATUS FOR CRUISE CONTROL BASED ON SCHOOL BUS

(71) Applicant: HYUNDAI MOTOR COMPANY, Seoul (KR)

(72) Inventor: Ji Hyun Yoon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 158 days.

(21) Appl. No.: 14/567,534

(22) Filed: Dec. 11, 2014

(65) Prior Publication Data

US 2016/0082958 A1   Mar. 24, 2016

(30) Foreign Application Priority Data

Sep. 22, 2014   (KR) ........................ 10-2014-0125905

(51) Int. Cl.
*B60W 30/14*   (2006.01)

(52) U.S. Cl.
CPC .................................... *B60W 30/14* (2013.01)

(58) Field of Classification Search
CPC ...... B60W 30/00; B60W 30/14; B60W 30/16; B60W 30/09; B60W 20/095; B60W 30/10
USPC .......................................................... 701/93
See application file for complete search history.

(56) References Cited

U.S. PATENT DOCUMENTS

| 6,223,125 | B1 | 4/2001 | Hall |
| RE38,870 | E | 11/2005 | Hall |
| 7,616,781 | B2 * | 11/2009 | Schofield ........... G06K 9/00818 382/104 |
| 7,904,219 | B1 * | 3/2011 | Lowrey ................. G01C 21/26 701/32.3 |
| 2003/0070603 | A1 | 4/2003 | VanderMolen et al. |
| 2003/0141990 | A1 | 7/2003 | Coon |

FOREIGN PATENT DOCUMENTS

| JP | 2002-541536 A | 12/2002 |
| JP | 2014-067125 A | 4/2014 |
| KR | 1998-0001319 A | 3/1998 |
| KR | 2011-0013874 A | 2/2011 |

* cited by examiner

*Primary Examiner* — Richard Camby
(74) *Attorney, Agent, or Firm* — McDermott Will & Emery LLP

(57) ABSTRACT

Method and apparatus for a vehicle cruise control, particularly concerning a school bus, which includes collecting information on the school bus and a road environment positioned around nearby vehicle, monitoring position, velocity and moving direction of the school bus, and state of surrounding road. If the school bus is stopped relatively near the front of the nearby vehicle, the method continues by determining whether or not the vehicle is stopped by comparing the collected school bus information and the road environment information with a predefined cruise regulation based on the school bus, and guiding the driver to stop as well as controlling the vehicle to stop depending on the determination result.

14 Claims, 14 Drawing Sheets

(STOP)

(CRUISE)

METHOD AND APPARATUS FOR CRUISE CONTROL BASED ON SCHOOL BUS

CROSS-REFERENCE TO RELATED APPLICATION

This application is based on and claims the benefit of priority to Korean Patent Application No. 10-2014-0125905, filed on Sep. 22, 2014 in the Korean Intellectual Property Office, the disclosure of which is incorporated herein in its entirety by reference.

TECHNICAL FIELD

The present disclosure relates to a method and an apparatus for a cruise control based on a school bus, and more particularly, to a technology for controlling a stop state of another vehicle depending on a stop position of the school bus and on a road environment.

BACKGROUND

In general, children and preschoolers who get on or off a school bus may suddenly run out into a road even though they are governed by teachers. Therefore, in the case in which other vehicles cruise by the school bus and pass by the school bus when the school bus is stopped, an accident whereby the vehicle collides with the children and the preschoolers may occur.

Recently, in Korea, a road traffic act associated with the school bus has been established, designed to prevent the accidents, which may happen to children and preschoolers as they get on or off the school bus, by forcing other vehicles to stop or to cruise slowly around the stopped school bus so as to pass by the school bus or not to pass the school bus. Furthermore, in the U.S.A, and other countries, not just locally, regulations for the vehicle cruised around the school bus are established.

However, since the most drivers cruise by passing by the school bus or passing the school bus while maintaining driving past even though the school bus is stopped, they do not see children and the preschoolers who suddenly run out from ahead of the school bus, and hence the accidents in which vehicles collide with the children and the preschoolers frequently occur.

Furthermore, even when accidents by colliding with children and preschoolers do not occur, since the drivers commit violations of the traffic act based on the school bus regulations of which they are unaware, a crackdown may occur.

SUMMARY

The present disclosure has been made to solve the above-mentioned problems occurring in the prior art while advantages achieved by the prior art are maintained intact.

An aspect of the present disclosure provides a method and an apparatus for a cruise control based on a school bus which is capable of registering a cruise regulation relating to the bus and guiding a stop of another vehicle or automatically stopping the vehicle according to the cruise regulation using an advanced driver assistance system (ADAS) or an autonomous system when the school bus is stopped ahead.

According to an exemplary embodiment, a method for a cruise control based on a school bus includes: collecting information on the school bus and a road environment information which are positioned around a vehicle; monitoring a position, velocity and a moving direction of the school bus, and a state of surrounding road; if the school bus is stopped just ahead of the vehicle, determining whether or not the vehicle is stopped by comparing the collected school bus information and road environment information with a predefined cruise regulation based on the school bus; and guiding the stop to a driver and controlling the vehicle so as to be stopped depending on the determination result.

For determining whether or not the vehicle is stopped, if the moving direction of the school bus is the same that of the vehicle, it may be determined that the vehicle is stopped.

If the school bus is positioned in the same lane as that of the vehicle or a next lane thereof, it may be determined that the vehicle is stopped.

IF the moving direction of the school bus is opposite to a moving direction of the vehicle, it may be determined whether or not the vehicle is stopped depending on whether a centerline is present on a corresponding road.

If the centerline is not present on the corresponding road, it may be determined that the vehicle is stopped.

If the moving direction of the school bus is opposite to a moving direction of the vehicle, it may be determined whether or not the vehicle is stopped depending on the number of lanes on a corresponding road.

If the corresponding road is a double lane, it may be determined that the vehicle is stopped.

If the moving direction of the school bus is opposite to a moving direction of the vehicle, it may be determined whether or not the vehicle is stopped depending on whether or not a median strip is present on a corresponding road and a height of the median strip.

If the median strip is not present on the corresponding road, it may be determined that the vehicle is stopped.

If the height of the median strip disposed on the corresponding road is less than a reference value, it may be determined that the vehicle is stopped.

For controlling the vehicle so as to be stopped, the vehicle may be controlled to maintain a stopped state until the school bus which is stopped at the front of the vehicle starts a cruise.

According to another exemplary embodiment an apparatus for a cruise control based on a school bus includes: a surrounding environment monitor configured to collect information on the school bus and a road environment which are positioned around a vehicle and monitor a position, velocity and a moving direction of the school bus, and a state of surrounding road; a determiner configured to determine whether or not the vehicle is stopped by comparing the collected school bus information and road environment information with a predefined cruise regulation based on the school bus if the school bus is stopped near the front of the vehicle; and a cruise controller configured to guide the stop to a driver and control the vehicle so as to be automatically stopped or maintain a cruise state depending on the determination result of the determiner.

The surrounding environment monitor may collect the school bus information and the road environment information from at least one of a sensor, navigation, and a communicator which are included in the vehicle.

The sensor may include at least one of a lidar, a radar, and a camera.

The communicator may receive information on the school bus and the road environment which are positioned around the vehicle through communication with at least one of surrounding vehicles, roadside devices, and a control center.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
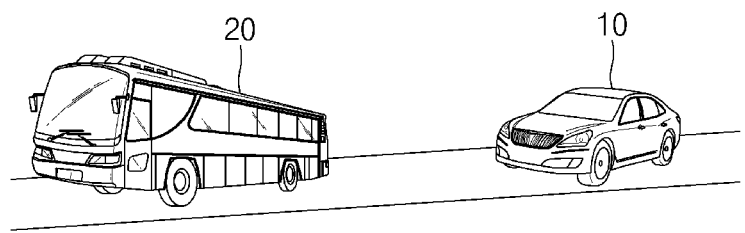
FIGS. 1 and 2 are diagrams illustrating vehicles to which an apparatus for a cruise control based on a school bus according to an exemplary embodiment of the present invention is applied.

It is to be noted that technical terms used in the specification are used for describing specific embodiments and do not limit the present invention. In addition, unless indicated otherwise in the present invention, it is to be understood that all the technical terms used in the present invention are construed as meaning as those that are generally understood by those who skilled in the art and as excessively comprehensive meanings and excessively reduced meanings. In addition, when the technical terms used in the present invention are wrongly technical terms that do not accurately indicate the technical spirit of the present invention, it is to be understood that the terms are replaced with the technical terms understood by those skilled in the art. Further, the general terms used in the present invention must be understood according to the terms defined by the dictionary or the context and should not be excessively reduced meanings.

In addition, singular forms used in the present invention are intended to include plural forms unless the context clearly indicates otherwise. In the present invention, it is to be noted that the terms "comprising" or "including', and the like, are not be construed as necessarily including several components or several steps described in the present invention and some of the above components or steps may not be included or additional components or steps are construed as being further included.

Terms including an ordinal number such as first, second, or the like, used in the present invention may be used to describe components. However, these components are not limited to these terms. The terms are used to distinguish one component from another component. For example, the 'first' component may be named as the 'second' component, and vice versa, without departing from the scope of the present invention.

Hereinafter, exemplary embodiments of the present invention will be described in more detail with reference to the accompanying drawings. The same reference numerals will be used to describe the same or like components, independent of the reference numerals and an overlapped description of the same components will be omitted.

Further, when it is determined that the detailed description of the known art related to the present invention may obscure the gist of the present invention, the detailed description thereof will be omitted. In addition, it is to be noted that the accompanying drawings are provided only in order to allow the spirit of the present invention to be easily understood and is to be interpreted as limiting the spirit of the present invention.

Figure 2:
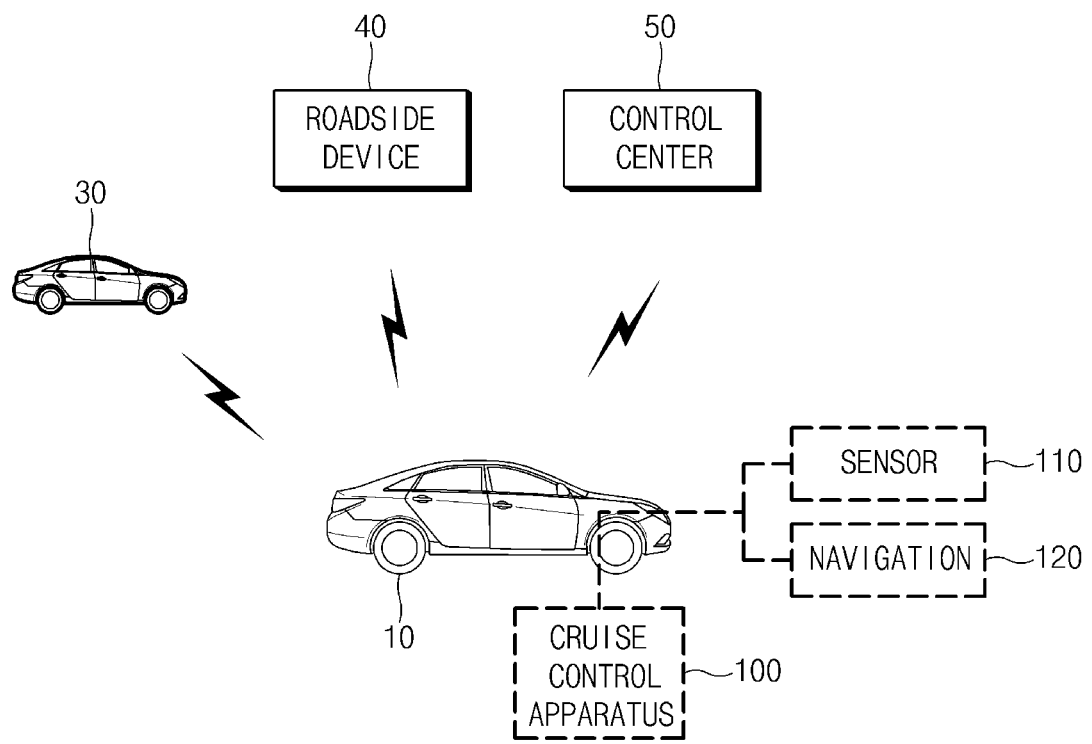

FIGS. 1 and 2 are diagrams illustrating vehicles to which an apparatus for a cruise control based on a school bus according to an exemplary embodiment of the present invention is applied.

As illustrated in FIG. 1, in the case in which a school bus 20 is stopped at the front of a vehicle 10 to which an apparatus for a cruise control based on a school bus (hereinafter, referred to as 'cruise control apparatus') according to an exemplary embodiment of the present invention is applied, the vehicle 10 is stopped by automatically decreasing velocity of the vehicle 10 depending on a position, velocity, a moving direction, and the like of the school bus 20.

The cruise control apparatus may determine whether or not the corresponding vehicle 10 is stopped depending on a road environment on which the vehicle 10 cruises as well as the position, the velocity, the moving direction, and the like of the school bus 20.

In this case, the cruise control apparatus may determine whether or not the vehicle 10 is stopped by registering a cruise regulation based on the school bus 20 and comparing school bus 20 information and road environment information which are collected from the surroundings of the vehicle 10 with the cruise regulation. A detailed description of conditions for determining whether or not the vehicle 10 is stopped will be described with reference to exemplary embodiments of FIGS. 4A to 5D.

The cruise control apparatus 100 may collect the school bus information, for example, distance, direction, velocity, and the like from the school bus 20 and may also collect the road environment information, for example, centerline information, information on the number of lanes, information on a topographic object such as a median strip using a sensor 110, navigation 120, and the like included in the vehicle 10 as illustrated in FIG. 2, when collecting surrounding environment information.

The above-mentioned school bus information and road environment information may be collected from surrounding vehicles 30 connected through vehicle-to-vehicle (V2V) communication and may also be collected form roadside devices 40 connected through vehicle-to-infrastructure (V2I) communication. In addition, the cruise control apparatus may collect the school bus information and the road environment information from an Internet server such as a control center 50 which is connected to the internet connected through a communicator.

Here, the cruise control apparatus 100 may identify the school bus information and the road environment information by combining information collected from at least two of the sensor 110, the navigation 120, the surrounding vehicles 30, the roadside devices 40, and the control center 50.

A more detailed configuration of the cruise control apparatus 100 will now be described with reference to FIG. 3.

Figure 3:
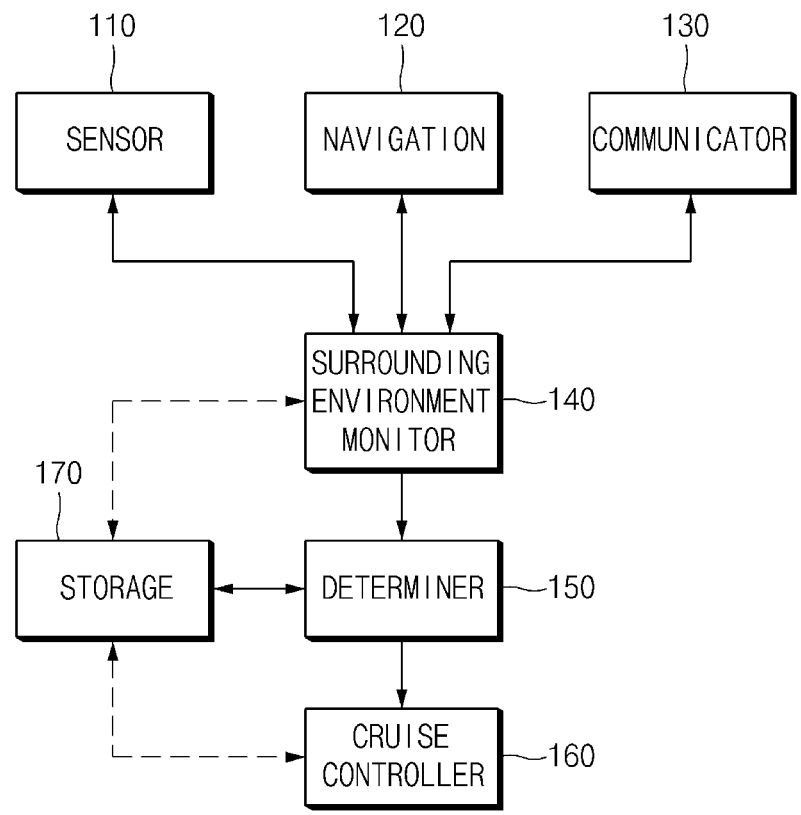
FIG. 3 is a block diagram illustrating a configuration of the apparatus for the cruise control based on the school bus according to the exemplary embodiment of the present invention.

FIG. 3 is a block diagram illustrating a configuration of the apparatus for the cruise control based on the school bus according to the exemplary embodiment of the present invention.

Referring to FIG. 3, an apparatus for cruise control based on the school bus according to the exemplary embodiment of the present invention may include a sensor 110, navigation 120, a communicator 130, a surrounding environment monitor 140, a determiner 150, a cruise controller 160, and a storage 170.

The sensor 110 may include at least one of a lidar, a radar, and a camera. The sensor 110 may detect information such as a distance, a direction, velocity, and the like from the school bus which is positioned around the vehicle, and detect lanes around the vehicle, for example, road topology objects such as the centerline and the median strip. Of course, embodiments of the present invention may use any sensor 110 as long as the sensor detects the surrounding objects in addition to those as mentioned above. In this case, the school bus information and the road environment information detected by the sensor 110 are transmitted to the surrounding environment monitor 140.

The navigation 120, which is an apparatus having map information on surrounding regions of the vehicle, may provide information such as the number of lanes, whether or not the centerline is present, whether or not the median strip is present, and the like on the road on which the vehicle cruises using the map information. In this case, the school bus information and the road environment information provided by the navigation 120 are transmitted to the surrounding environment monitor 140.

The communicator 130 may include a communication module for the vehicle-to-vehicle (V2V) and vehicle-to-infrastructure (V2I) communications. In this case, the communicator 130 may receive the school bus information and the road environment information from the surrounding vehicles connected through the V2V communication module and a road infrastructure connected through the V2I communication module, for example, the roadside device, and the like.

In addition, the communicator 130 may further include an internet communication module. In this case, the communicator 130 may receive the school bus information and the road environment information from a server connected to the internet through the internet communication module, for example, the control center, and the like.

In this case, the school bus information and the road environment information received by the communicator 130 are transmitted to the surrounding environment monitor 140.

The surrounding environment monitor 140 collects the information on the school bus and the road environment which are positioned around the vehicle from at least one of the sensor 110, the navigation 120, and the communicator 130 described above. In this case, the surrounding environment monitor 140 monitors whether or not the school bus is present around the vehicle, the position, the velocity, and the moving direction of the corresponding school bus in the case in which the school bus is positioned around the vehicle, and the like. In addition, the surrounding environment monitor 140 monitors whether or not the centerline or the median strip of the road on which the vehicle cruises is present, the number of lanes of the corresponding road, and the like.

The surrounding environment monitor 140 may transmit the school bus information and the road environment information collected from at least one of the sensor 110, the navigation 120, and the communicator 130 to the determiner 150 and the cruise controller 160 in order to reflect the school bus information and the road environment information to the cruise control.

The determiner 150 determines from the school bus information transmitted from the surrounding environment monitor 140 whether or not the school bus is in a state in which it is stopped near the front of the vehicle. If the school bus is stopped near the front of the vehicle, the determiner 150 may determine whether or not the vehicle is stopped by comparing the school bus information and the road environment information collected from the surrounding environment monitor 140 with the predefined cruise regulation based on the school bus. If the school bus is stopped relatively near the rear of the vehicle, the determiner 150 may determine that the vehicle does not stop.

Here, the predefined cruise regulation based on the school bus may be defined so that the vehicle does not pass or passes the school bus according to a relative position between the school bus and the vehicle, moving directions of the school bus and the vehicle, lanes on which the school bus and the vehicle are positioned, whether or not the centerline or the median strip of the road is present, height of the median strip, the number of lanes of the road, and the like.

As an example, the determiner 150 may determine whether or not the moving direction of the school bus which is stopped at the front of the vehicle is the same as the moving direction of the vehicle. If the moving direction of the school bus is the same as the moving direction of the vehicle, the determiner 150 may determine that the vehicle is stopped.

Here, if the moving direction of the school bus is the same as the moving direction of the vehicle and the school bus is positioned on the same lane as that of the vehicle or a next lane, the determiner 150 may determine that the vehicle is stopped. In this case, if the vehicle is positioned on one-lane and the school bus is positioned on a four-lane, road the determiner 150 may determine that the vehicle is not stopped.

In addition, if the moving direction of the school bus is opposite to the moving direction of the vehicle, the determiner 150 may determine whether or not the vehicle is stopped depending on whether or not the centerline is present on the corresponding road. In other words, if the centerline is not present on the corresponding road, the determiner 150 may determine that the vehicle is stopped.

If the moving direction of the school bus is opposite to the moving direction of the vehicle and the centerline is present on the corresponding road, the determiner 150 may determine whether or not the vehicle is stopped depending on the number of lanes on the corresponding road. In this case, if the corresponding road is a double lane road, the determiner 150 may determine that the vehicle is stopped. In this case, if the corresponding road is a double lane or more road, the determiner 150 may determine that the vehicle is not stopped.

In addition, if the moving direction of the school bus is opposite to the moving direction of the vehicle, the determiner 150 may determine whether or not the vehicle is stopped depending on whether or not the median strip is present on the corresponding road, height of the median strip, and the like. In other words, if the moving direction of the school bus is opposite to the moving direction of the vehicle and a median strip is not present, the determiner 150 may determine that the vehicle is stopped.

In the case in which the moving direction of the school bus is opposite to the moving direction of the vehicle and a median strip is present, if the height of the median strip is less than a reference value, the determiner 150 may determine that the vehicle is stopped. In this case, if the height of the median strip is equal to or greater than the reference value, the determiner 150 may determine that the vehicle is not stopped.

The cruise controller 160 guides the stop to a driver and controls the vehicle so as to be automatically stopped or maintain a cruise state, depending on the determination result of the determiner 150. In other words, if the determiner 150 determines that the vehicle is stopped, the cruise controller 160 may control the vehicle so as to be stopped by outputting a message guiding the stop of the vehicle and gradually decreasing the velocity of the vehicle. In this case, the cruise controller 160 may guide a user to decrease the velocity of the vehicle.

In addition, after the vehicle is stopped, the cruise controller 160 may control the vehicle so as to maintain a stopped state until the school bus has stopped at the front of the vehicle starts the cruise.

As another example, if it is confirmed that the school bus cruises at the front of the same lane as the vehicle, the determiner 150 may determine prohibition of a pass by the vehicle for the school bus. In this case, the cruise controller 160 may control the cruise state of the vehicle and automatically control the vehicle so as not to be cruised by passing the school bus.

FIGS. 4A to 4E are illustrative diagrams referenced for describing operations of an apparatus for a cruise control based on a school bus according to an exemplary embodiment of the present invention.

Figure 4A:
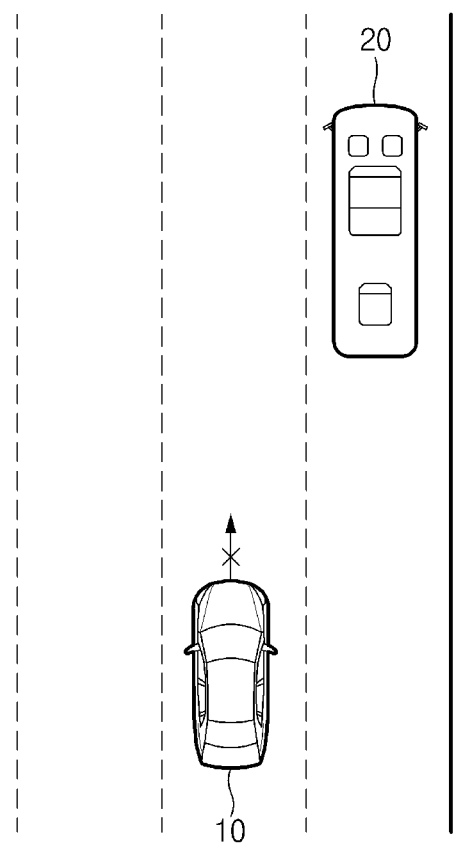
FIGS. 4A to 4E are illustrative diagrams referenced for describing operations of an apparatus for a cruise control based on a school bus according to a first exemplary embodiment of the present invention.

FIG. 4A illustrates an exemplary embodiment in which the school bus 20 is stopped at the front of the same direction as the moving direction of the vehicle 10 on the road on which the vehicle 10 cruises.

As illustrated in FIG. 4A, if the position of the school bus 20 is on the lane on which the vehicle 10 cruises or on the next lane in the state in which the school bus 20 is stopped near the front of the vehicle 10 on the road on which the vehicle 10 cruises, the cruise control apparatus controls the vehicle 10 to stop.

Figure 4B:
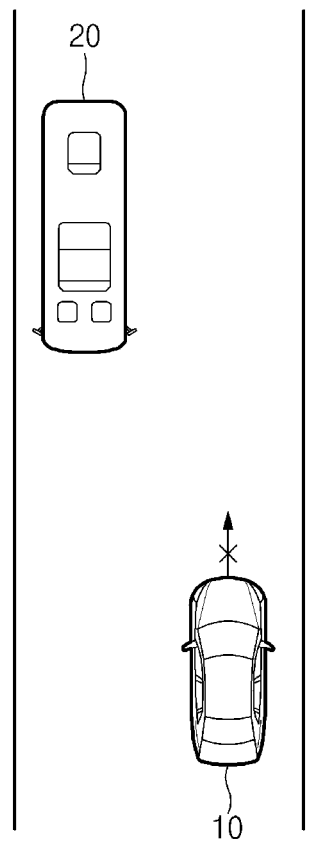

FIG. 4B illustrates an exemplary embodiment in which the school bus 20 is stopped at the front of a direction which is opposite to the moving direction of the vehicle 10 on the road on which the vehicle 10 cruises.

As illustrated in FIG. 4B, if the school bus 20 is stopped at the front of the vehicle 10 in the direction which is opposite to the moving direction of the vehicle 10, the cruise control apparatus checks on whether or not a centerline is present. In this case, if a centerline is not present on the corresponding road as illustrated in FIG. 4B, the cruise control apparatus controls the vehicle 10 to stop.

Figure 4C:
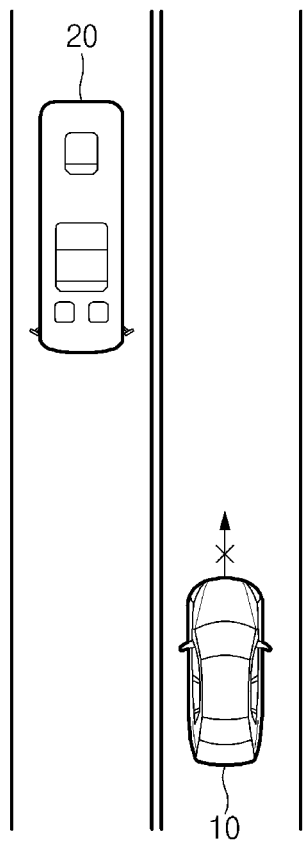

FIG. 4C illustrates another exemplary embodiment in which the school bus 20 is stopped at the front of a direction which is opposite to the moving direction of the vehicle 10 on the road on which the vehicle 10 cruises.

As illustrated in FIG. 4C, if the school bus 20 is stopped at the front of the vehicle 10 in the direction which is opposite to the moving direction of the vehicle 10 and a centerline is present on the corresponding road, the cruise control apparatus checks the number of lanes on the corresponding road. In this case, if the number of lanes on the corresponding road is a double lane as illustrated in FIG. 4C, the cruise control apparatus controls the vehicle 10 to stop.

Figure 4D:
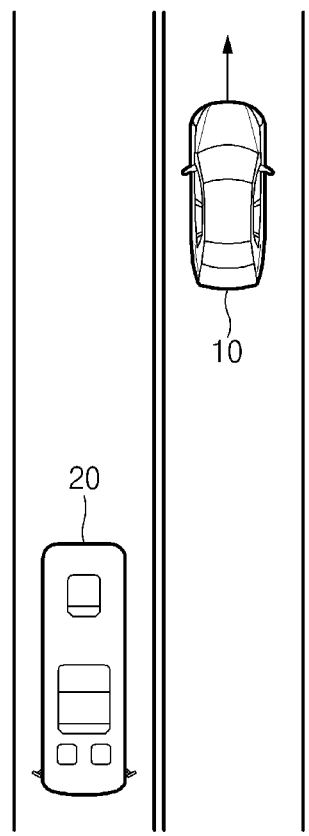

If the centerline is present on the corresponding road and the number of lanes on the corresponding road is the double lane or more as illustrated in FIG. 4D, the cruise control apparatus maintains the cruise of the vehicle 10.

Figure 4E:
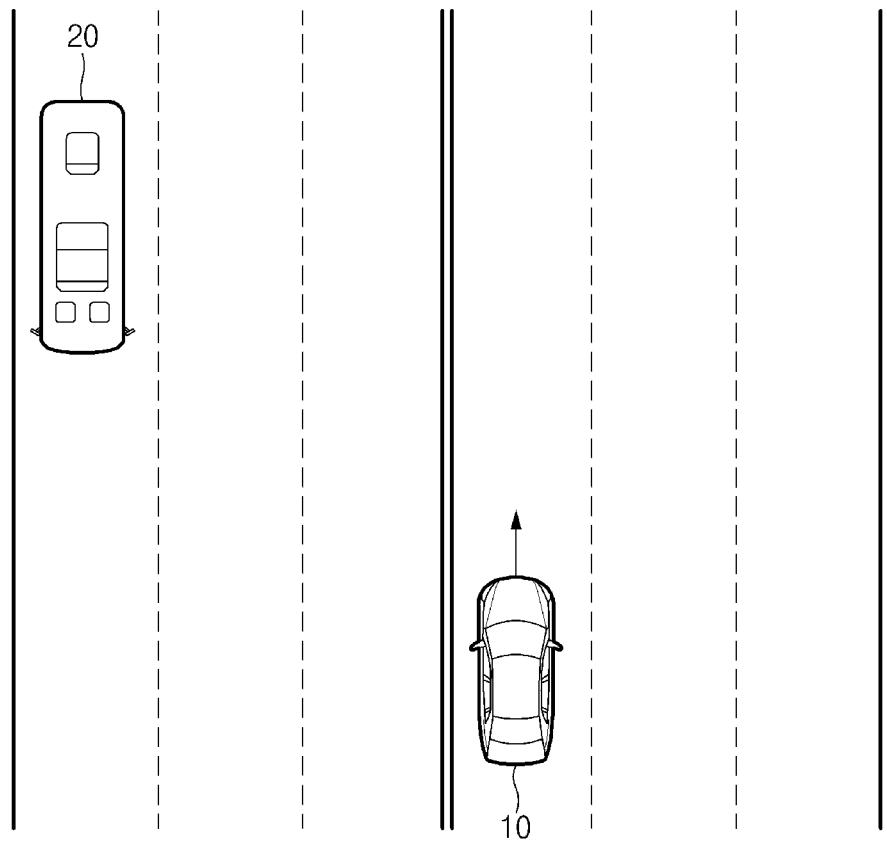

FIG. 4E illustrates an exemplary embodiment in which the school bus 20 is stopped at the rear of a direction which is opposite to the moving direction of the vehicle 10 on the road on which the vehicle 10 cruises. In this case, since the school bus 20 is positioned at the rear of the driving vehicle 10, the cruise control apparatus maintains the cruise of the vehicle 10.

FIGS. 5A to 5D are illustrative diagrams referenced for describing operations of an apparatus for a cruise control based on a school bus according to a second exemplary embodiment of the present invention.

Figure 5A:
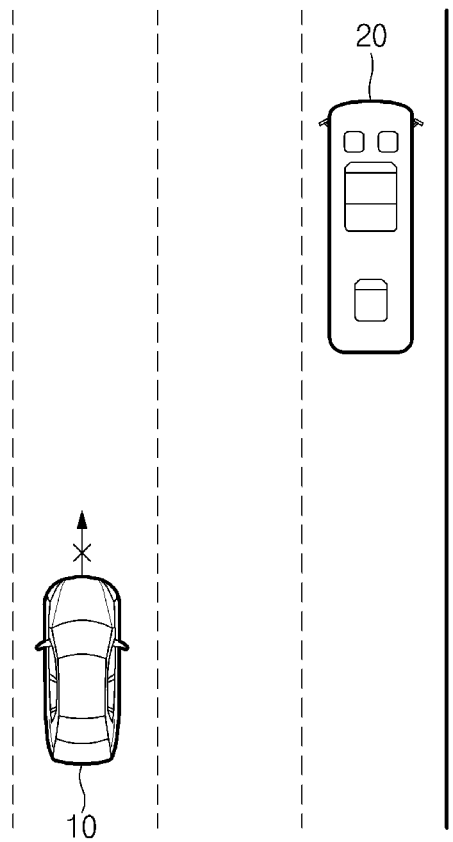
FIGS. 5A to 5D are illustrative diagrams referenced for describing operations of an apparatus for a cruise control based on a school bus according to a second exemplary embodiment of the present invention.

FIG. 5A illustrates an exemplary embodiment in which the school bus 20 is stopped at the front of the same direction as the moving direction of the vehicle 10 on the road on which the vehicle 10 cruises.

Although the exemplary embodiment of FIG. 4A determines whether or not the vehicle 10 is stopped by considering the lanes on which the vehicle 10 and the school bus 20 are positioned, the exemplary embodiment illustrated in FIG. 5A shows that the cruise control apparatus controls the vehicle 10 so as to be stopped regardless of the lanes on which the vehicle 10 and the school bus 20 are positioned in the case in which the school bus 20 is stopped near the front on the road on which the vehicle 10 cruises.

This shows that conditions may be differently set by reflecting the road regulations which are defined for each city or each country.

Figure 5B:
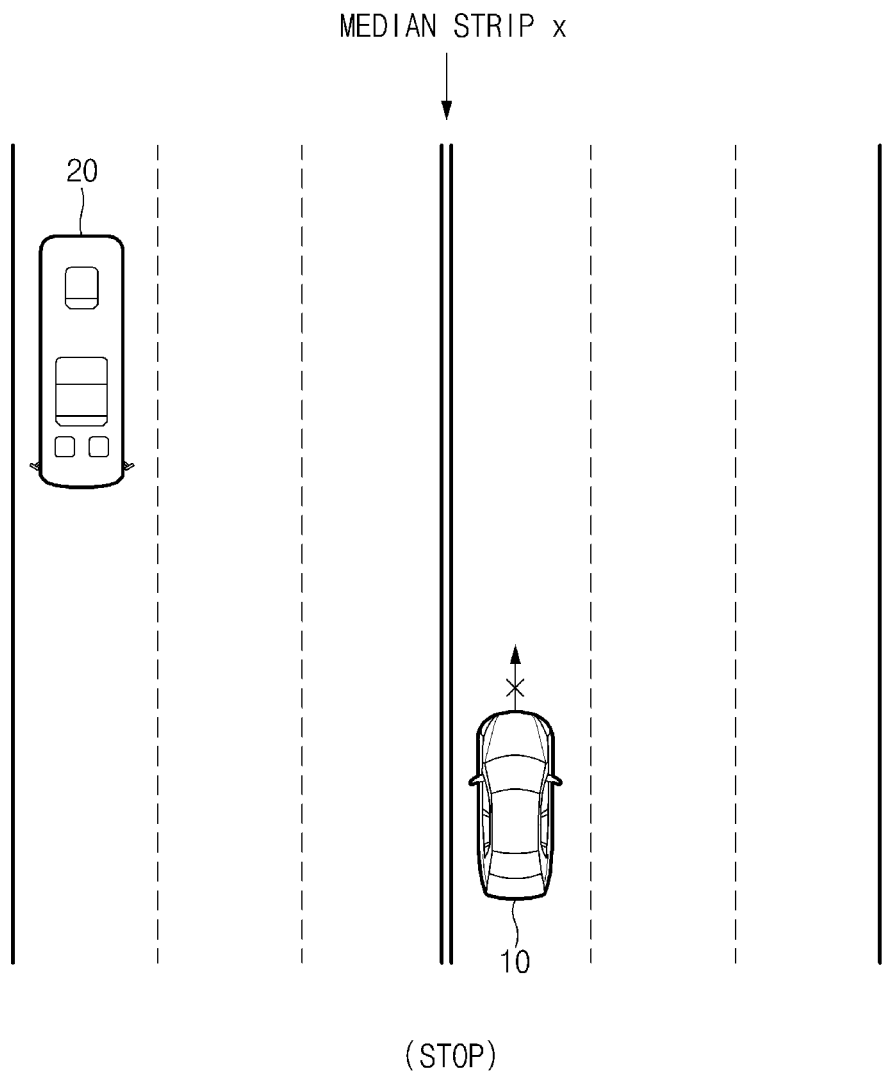

FIG. 5B illustrates an exemplary embodiment in which the school bus 20 is stopped at the front of a direction which is opposite to the moving direction of the vehicle 10 on the road on which the vehicle 10 cruises.

As illustrated in FIG. 5B, if the school bus 20 is stopped at the front of the vehicle 10 in the direction which is opposite to the moving direction of the vehicle 10, the cruise control apparatus checks on whether or not a median strip is present. In this case, if a median strip is not present on the corresponding road as illustrated in FIG. 5B, the cruise control apparatus controls the vehicle 10 to stop.

Figure 5C:
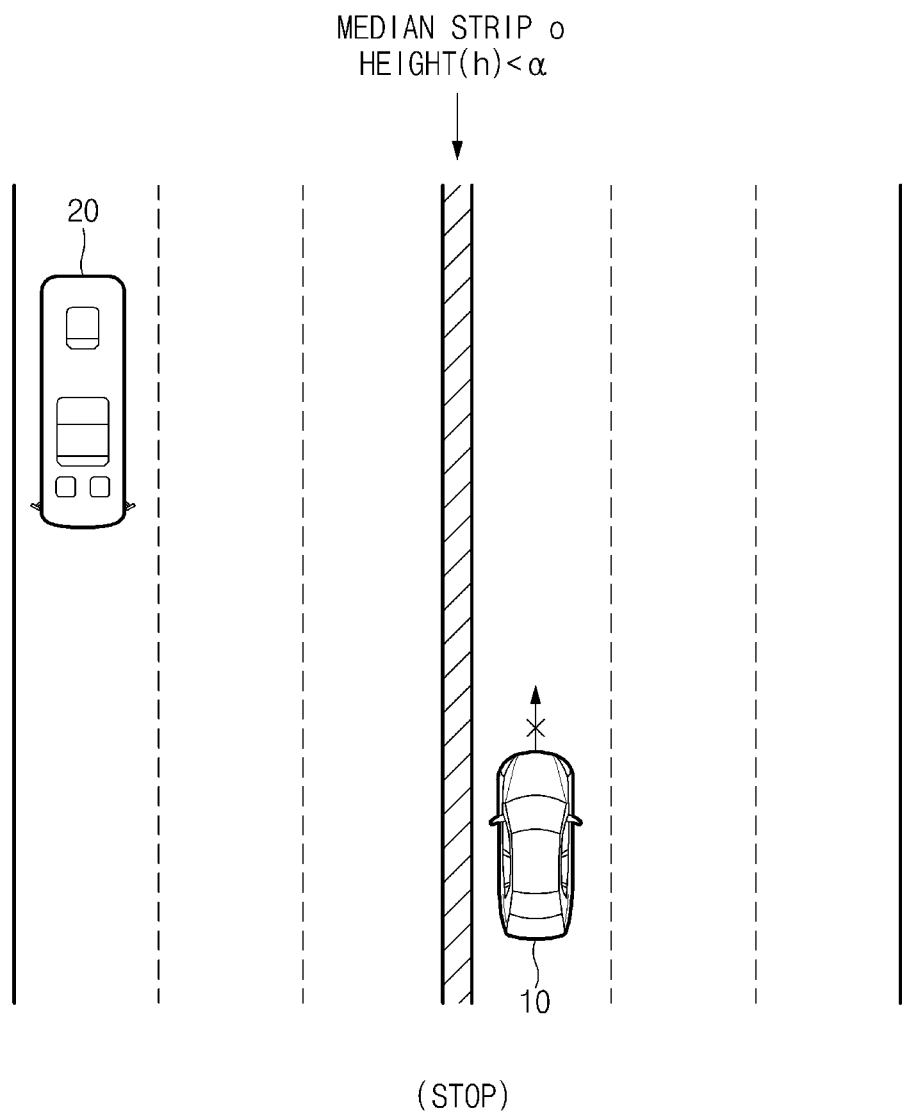

FIG. 5C illustrates another exemplary embodiment in which the school bus 20 is stopped at the front of a direction which is opposite to the moving direction of the vehicle 10 on the road on which the vehicle 10 cruises.

As illustrated in FIG. 5C, if the school bus 20 is stopped at the front of the vehicle 10 in the direction which is opposite to the moving direction of the vehicle 10 and the median strip is present on the corresponding road, the cruise control apparatus checks the height h of the median strip disposed on the corresponding road. In this case, if the height h of the median strip is less than the reference value $\alpha$, as illustrated in FIG. 5C, the cruise control apparatus controls the vehicle 10 to stop.

Figure 5D:
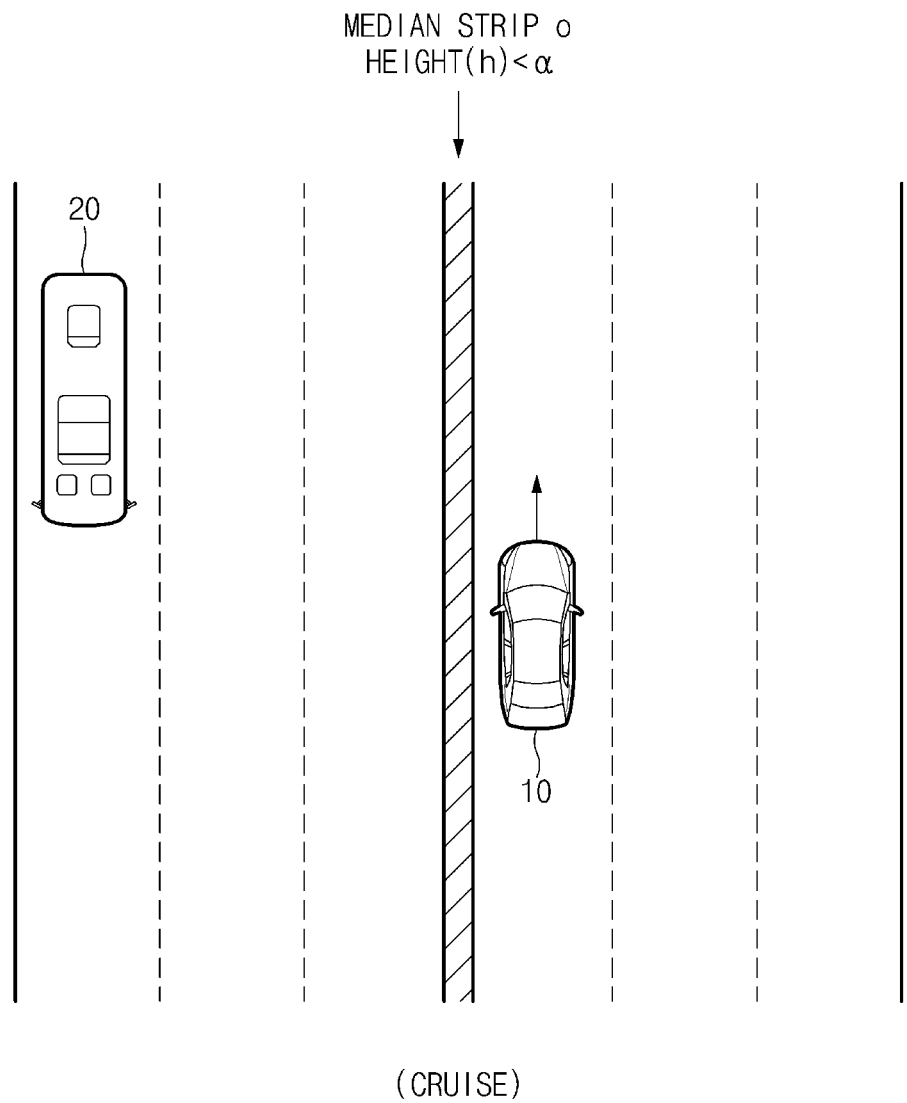

If the height h of the median strip disposed on the corresponding road is equal to or greater than the reference value $\alpha$, as illustrated in FIG. 5D, the cruise control apparatus maintains the cruise of the vehicle 10.

An operation flow of the apparatus for the cruise control based on the school bus 20 according to the exemplary embodiment of the present invention configured as described above will be described below in more detail.

Figure 6:
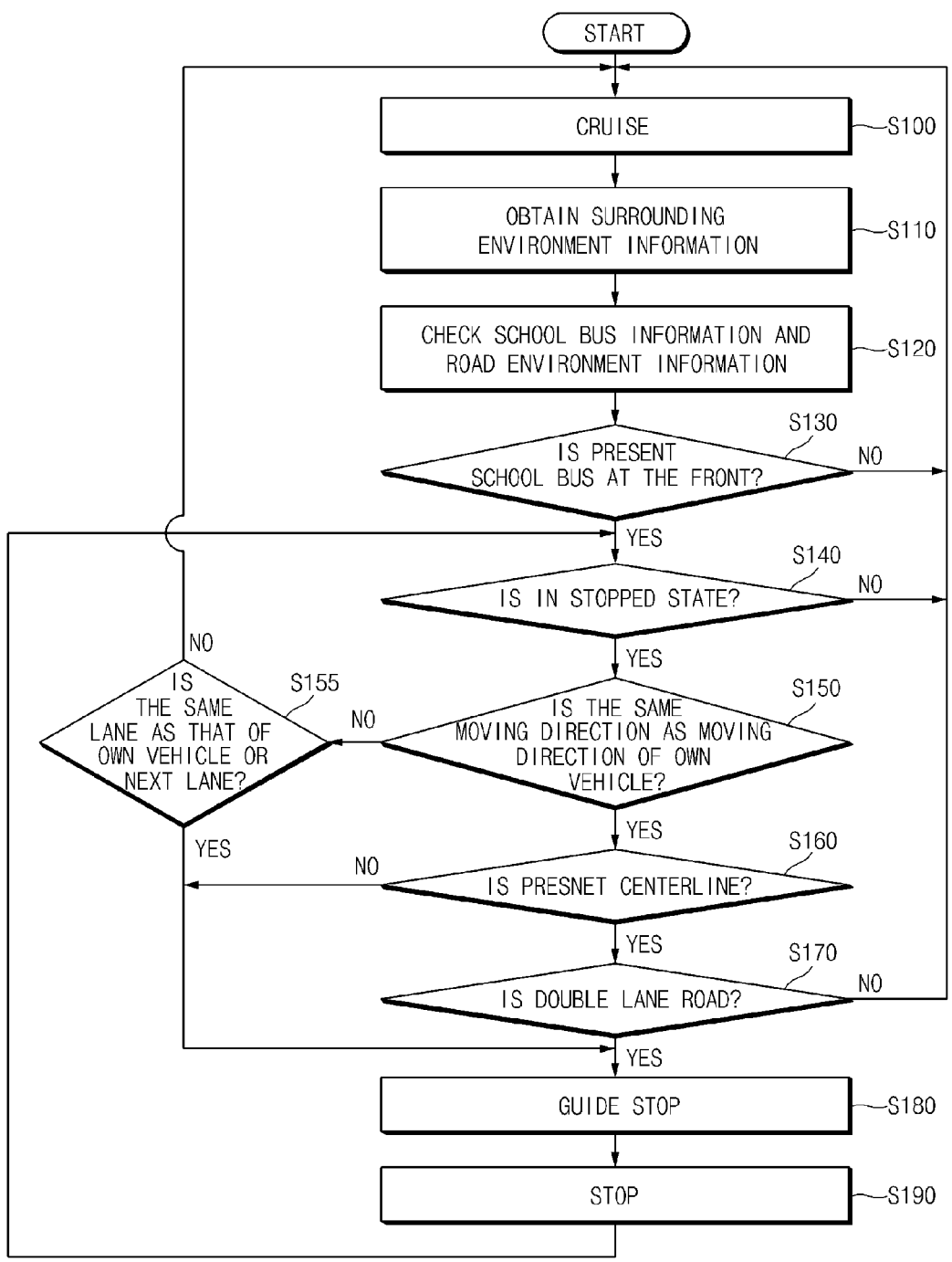
FIG. 6 is a flow chart illustrating an operation flow for a method for a cruise control based on a school bus according to the first exemplary embodiment of the present invention.

FIG. 6 is a flow chart illustrating an operation flow for a method for a cruise control based on a school bus according to the first exemplary embodiment of the present invention.

As illustrated in FIG. 6, the cruise control apparatus obtains surrounding environment information through the sensor, the navigation, the V2X communication, and the like during the cruise (S100, S110). In this case, the cruise control apparatus checks on the surrounding environment information which is obtained from 'S110' process, for example, the school bus information and the road environment information (S120).

Here, the school bus information may include information on the position, the velocity, the moving direction, and the like of the school bus, and the road environment information may include information on a state of the surrounding road, that is, road structures, number of lanes, whether or not centerline is present, and the like.

If the school bus is present at the front of the vehicle (S130), the cruise control apparatus checks on whether or not the corresponding school bus is in a stopped state (S140). In this case, if the school bus is not in the stopped state, the cruise control apparatus continuously maintains the cruise state of the vehicle.

Meanwhile, if the school bus which is positioned at the front of the vehicle is in the stopped state, the cruise control apparatus checks the moving direction of the school bus (S150). In this case, if the moving direction of the school bus is the same as the moving direction of a driver's own vehicle (S150), the cruise control apparatus compares the lane on which the school bus is positioned and the lane on which the own vehicle is positioned with each other, and if the lane on which the school bus is positioned is the same lane as that of the own vehicle or the next lane thereof (S155), the cruise control apparatus guides the stop to the driver (S180) and controls the own vehicle to stop (S190). On the other hand, if the lane on which the school bus is positioned is not the lane on which the own vehicle is positioned or the next lane thereof, the cruise control apparatus continuously maintains the cruise state of the own vehicle.

In the case in which the moving direction of the school bus is the direction which is opposite to the moving direction of the own vehicle, the cruise control apparatus checks on whether or not a centerline is present on the corresponding road (S160), and if the corresponding road is a road on which the centerline is not present, the cruise control apparatus guides the stop to the driver (S180) and controls the own vehicle to stop (S190). Meanwhile, if it is checked that the centerline is present on the corresponding road in process 'S160', the cruise control apparatus checks on whether or not the number of lanes on the corresponding road is a double lane (S170), and if so, the cruise control apparatus guides the stop to the driver (S180) and controls the own vehicle to stop (S190). On the other hand, if the number of lanes on the corresponding road is a double lane or more, the cruise control apparatus continuously maintains the cruise state of the own vehicle.

As such, the cruise control apparatus repeatedly performs processes 'S100' to 'S190' while the vehicle cruises, and maintains the stopped state until the school bus which is stopped at the front starts the cruise in the state in which the vehicle is stopped in process 'S190'.

Figure 7:
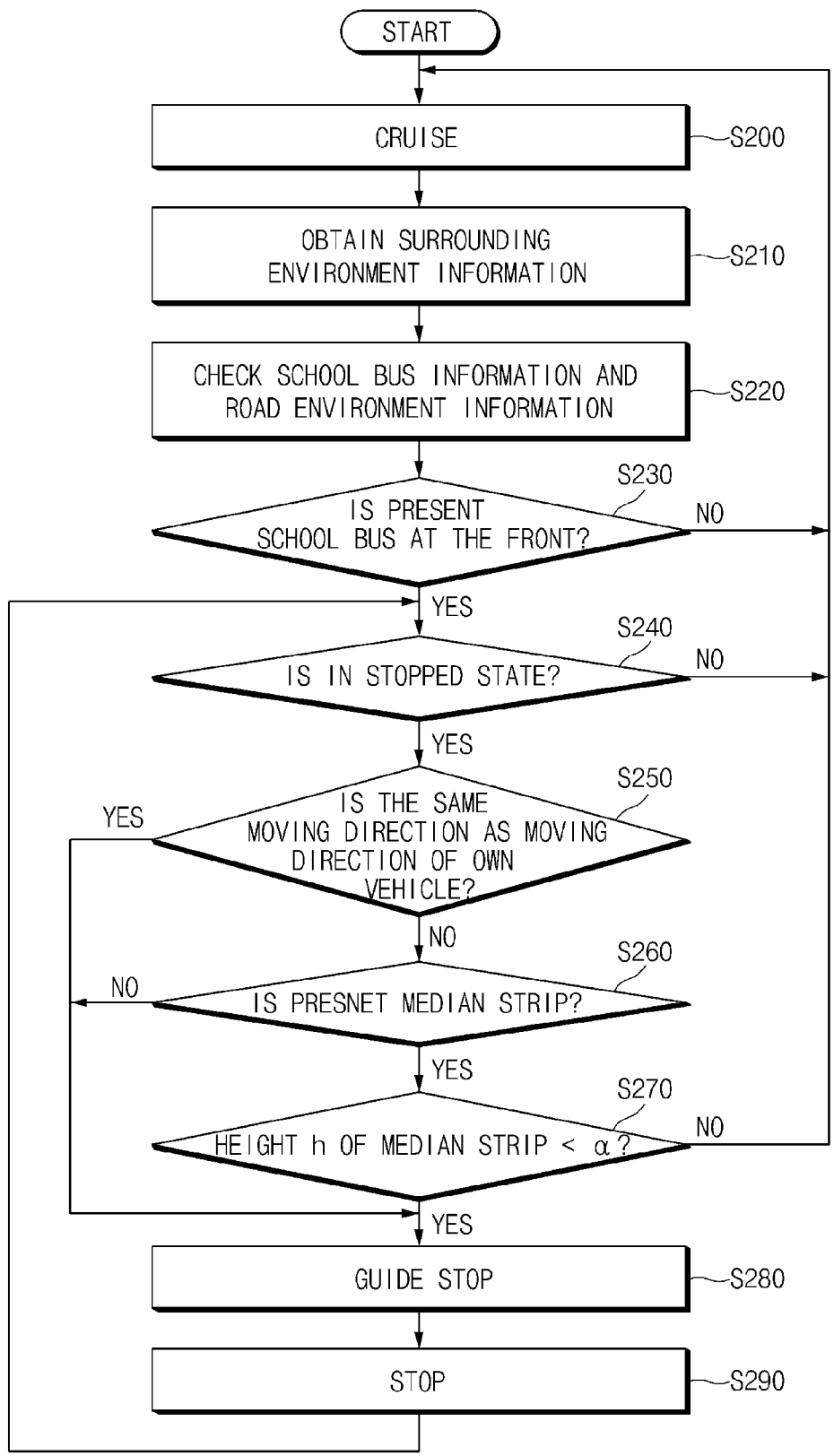
FIG. 7 is a flow chart illustrating an operation flow for a method for a cruise control based on a school bus according to the second exemplary embodiment of the present invention.

FIG. 7 is a flow chart illustrating an operation flow for a method for a cruise control based on a school bus according to the second exemplary embodiment of the present invention.

As illustrated in FIG. 7, the cruise control apparatus obtains surrounding environment information through the sensor, the navigation, the V2X communication, and the like during cruise (S200, S210). In this case, the cruise control apparatus checks the surrounding environment information which is obtained from process 'S210', for example, the school bus information and the road environment information (S220).

Here, the school bus information may include information on the position, the velocity, moving direction, and the like of the school bus, and the road environment information may include a state of the surrounding road, that is, road structures, the number of lanes, whether or not a centerline is present, and the like.

If the school bus is present at the front of the vehicle (S230), the cruise control apparatus checks on whether or not the corresponding school bus is in a stopped state (S240). In this case, if the school bus is not in the stopped state, the cruise control apparatus continuously maintains the cruise state of the vehicle.

If the school bus which is positioned at the front of the vehicle is in the stopped state, the cruise control apparatus checks the moving direction of the school bus (S250). In this case, if the moving direction of the school bus is the same as the moving direction of the driver's own vehicle, the cruise control apparatus guides a stop to the driver (S280) and controls the vehicle to stop (S290).

In the case in which the moving direction of the school bus is the direction which is opposite to the moving direction of the own vehicle, the cruise control apparatus checks on whether or not the median strip is present on the corresponding road (S260), and if the corresponding road is a road on which a median strip is not present, the cruise control apparatus guides a stop to the driver (S280) and controls the vehicle to stop (S290). If it is checked that the median strip is present on the corresponding road in process 'S260', the cruise control apparatus checks the height h of the median strip (S270), and if the height h of the median strip is less than the reference value α, the cruise control apparatus guides the driver to stop (S280) and controls the own vehicle to stop (S290). On the other hand, if the height h of the median strip disposed on the corresponding road is equal to or greater than the reference value α, the cruise control apparatus continuously maintains the cruise state of the own vehicle.

As such, the cruise control apparatus repeatedly performs processes 'S200' to 'S290' while the vehicle cruises, and maintains the stopped state until the school bus which is stopped at the front starts the cruise in the state in which the vehicle is stopped in process 'S290'.

The above-mentioned processes may be directly implemented by hardware executed by a processor, a software module, or a combination of them. The software module may be resided on a storing medium (i.e., the memory and/or the storage) such as a random access memory (RAM) memory, a flash memory, a read only memory (ROM) memory, an erasable programmable read only memory (EPROM) memory, an electrically erasable programmable read only memory (EEPROM) memory, a register, a hard disk, a removable disk, or a compact disc-read only memory (CD-ROM). An illustrative storing medium may be coupled to the processor and the processor may read information from the storing medium and write the information into the storing medium. Alternatively, the storing medium may be integral with the processor. The processor and the storing medium may be resided within an application specific integrated circuit (ASIC). The ASIC may be resided within a user terminal. Alternatively, the processor and the storing medium may be resided within the user terminal as an individual component.

As described above, according to the exemplary embodiments of the present invention, it is possible to prevent the regulation violation which may occur by a forward-looking negligence of the driver and also protect the children and the preschoolers who get on or off the school bus by guiding the stop of the vehicle or automatically stopping the vehicle according to the cruise regulation based on the school bus using the advanced driver assistance system (ADAS) or the autonomous system when the school bus is stopped at the front.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description. Therefore, the spirit of the present invention should not be limited to the above-described exemplary embodiments, and the following claims as well as all technical spirits modified equally or equivalently to the claims should be interpreted to fall within the scopes and spirits of the invention.

What is claimed is:

1. A method for a cruise control based on a school bus, the method comprising:
   collecting information on the school bus and a road environment which are positioned around a vehicle;
   monitoring a position, a velocity and a moving direction of the school bus, and a state of surrounding road;
   if the school bus is stopped relatively near the front of the vehicle, determining whether or not the vehicle is stopped by comparing the collected school bus information and road environment information with a predefined cruise regulation based on the school bus; and
   guiding a driver to stop and controlling the vehicle to stop depending on the determination result,
   wherein, in the determining of whether or not the vehicle is stopped, if the moving direction of the school bus is the same as a moving direction of the vehicle, it is determined that the vehicle is stopped.

2. The method according to claim 1, wherein, in the determining of whether or not the vehicle is stopped, if the school bus is stopped in the same lane as that of the vehicle or a next lane thereof, it is determined that the vehicle is stopped.

3. A method for a cruise control based on a school bus, the method comprising:
   collecting information on the school bus and a road environment which are positioned around a vehicle;
   monitoring a position, a velocity and a moving direction of the school bus, and a state of surrounding road;
   if the school bus is stopped relatively near the front of the vehicle, determining whether or not the vehicle is stopped by comparing the collected school bus information and road environment information with a predefined cruise regulation based on the school bus; and
   guiding a driver to stop and controlling the vehicle to stop depending on the determination result,
   wherein, in the determining of whether or not the vehicle is stopped, if the moving direction of the school bus is opposite to a moving direction of the vehicle, it is determined whether or not the vehicle is stopped depending on the state of surrounding road.

4. The method according to claim 3, wherein, in determining whether or not the vehicle is stopped, if a centerline is not present on a corresponding road, it is determined that the vehicle is stopped.

5. The method according to claim 3, wherein, in determining whether or not the vehicle is stopped, if the moving direction of the school bus is opposite to a moving direction of the vehicle, it is determined whether or not the vehicle is stopped depending on the number of lanes on a corresponding road.

6. The method according to claim 5, wherein, in determining whether or not the vehicle is stopped, if the corresponding road is a double lane, it is determined that the vehicle is stopped.

7. The method according to claim 3, wherein, in determining whether or not the vehicle is stopped, if the moving direction of the school bus is opposite to a moving direction of the vehicle, it is determined whether or not the vehicle is stopped depending on whether or not a median strip is present on a corresponding road and on a height of the median strip.

8. The method according to claim 7, wherein, in determining whether or not the vehicle is stopped, if the median strip is not present on the corresponding road, it is determined that the vehicle is stopped.

9. The method according to claim 7, wherein, in determining whether or not the vehicle is stopped, if the height of the median strip disposed on the corresponding road is less than a reference value, it is determined that the vehicle is stopped.

10. A method for a cruise control based on a school bus, the method comprising:
    collecting information on the school bus and a road environment which are positioned around a vehicle;
    monitoring a position, a velocity and a moving direction of the school bus, and a state of surrounding road;
    if the school bus is stopped relatively near the front of the vehicle, determining whether or not the vehicle is stopped by comparing the collected school bus information and road environment information with a predefined cruise regulation based on the school bus; and
    guiding a driver to stop and controlling the vehicle to stop depending on the determination result,
    wherein, in controlling of the vehicle to stop, the vehicle is controlled to maintain a stopped state until the school bus, which is stopped at the front of the vehicle, starts a cruise.

11. An apparatus for a cruise control based on a school bus, the apparatus comprising:
    a surrounding environment monitor configured to collect information on the school bus and a road environment which are positioned around a vehicle and to monitor a position, a velocity and a moving direction of the school bus, and a state of surrounding road;
    a determiner configured to determine whether or not the vehicle is stopped by comparing the collected school bus information and road environment information with a predefined cruise regulation based on the school bus if the school bus is stopped relatively at the front of the vehicle; and
    a cruise controller configured to guide the stop to a driver and to control the vehicle to automatically stop or maintain a cruise state depending on the determination result of the determiner,
    wherein the determiner determines whether or not the vehicle is stopped depending on the state of surrounding road when the moving direction of the school bus is opposite to a moving direction of the vehicle, and
    wherein the determiner determines that the vehicle is stopped when the moving direction of the school bus is the same as a moving direction of the vehicle.

12. The apparatus according to claim 11, wherein the surrounding environment monitor collects the school bus information and the road environment information from at least one of a sensor, navigation, and a communicator which are included in the vehicle.

13. The apparatus according to claim 12, wherein the sensor includes at least one of a lidar, a radar, and a camera.

14. The apparatus according to claim 12, wherein the communicator receives information on the school bus and the road environment which are positioned around the vehicle through communication with at least one of surrounding vehicles, roadside devices, and a control center.

* * * * *